INVENTOR
GUNTHER M. LEUTERITZ

REACTION TIME (HOURS)
IN FOUR-STAGE CASCADE LOOP REACTOR

United States Patent Office 3,823,172
Patented July 9, 1974

---

3,823,172
PROCESS FOR CONTINUOUS AND SELECTIVE CATALYTIC PARTIAL HYDROGENATION OF UNSATURATED FATS AND OILS
Gunther Max Leuteritz, 106 Zehntenstrasse, 4133 Pratteln, Switzerland
Continuation-in-part of abandoned application Ser. No. 759,543, Sept. 13, 1968. This application June 28, 1971, Ser. No. 157,501
Claims priority, application Austria, Mar. 25, 1968, A 2,937/68
Int. Cl. B01j 9/14; C11c 3/12
U.S. Cl. 260—409           1 Claim

ABSTRACT OF THE DISCLOSURE

The continuous and selective catalytic partial hydrogenation of organic compounds which in the liquid state are mixed with a catalyst and successively circulated in a plurality of stages is carried out in an apparatus which comprises a multiple stage reactor, of which each stage includes a reaction chamber through which flows the material to be treated in transverse direction. A circulation conduit is provided for each of the reaction chambers, which contain a suction nozzle connected to the inlet end of the circulation conduit. A suction chamber accommodates the suction nozzle and a conduit opens into the suction chamber to supply predetermined amounts of hydrogen under a predetermined pressure.

---

This is a continuation-in-part of my copending U.S. Patent Application, Ser. No. 759,543, filed Sept. 13, 1968, now abandoned, for "Process of and Device for the Continuous and Selective Catalytic Partial Hydrogenation of Organic Compounds."

BACKGROUND OF THE INVENTION

This invention relates to apparatus for the continuous and selective catalytic partial hydrogenation of organic compounds which, in their liquid state, are mixed with predetermined amounts of hydrogen and a catalyst and are successively circulated in a plurality of stages.

An essential characteristic of homogeneous basic fats is the melting characteristic which is represented by a high angle of inclination, alpha, of the dilatation temperature curve at clear melting points below 40° C. The extent of dilatation or melting of a fat depends on the ratio between the solid and liquid components of the fatty body at each temperature and determines the plasticity characteristics of the solid-liquid mixture at such temperature.

On the other hand, the ratio between the solid and liquid components which meets the requirements for a high angle of inclination and a favorable temperature-volume relationship depends on whether it is possible to control the exothermic heterogeneously catalyzed hydrogenation reaction between hydrogen and the polyunsaturated fatty acids so that the multiple double bonds of the fatty acids will be saturated in steps without carrying out the undesired side reaction which converts monoenes into high-melting, completely saturated fatty acid derivatives. In this manner, selective hydrogenation is achieved.

Other undesirable side reactions occur by way of migration of double bonds to result in the formation of position isomers and stereoisomers of fatty acids which are solid at room temperature but which have melting points which are lower than the completely saturated fatty acids. These isomerations which take place without the consumption of hydrogen are accelerated by the lack of hydrogen.

Therefore, conventional reaction processes for the production of margarine fats, in which the angle of inclination of the dilatation temperature curve is high in the final hydrogenation phase, require operating conditions designed to eliminate the formation of completely hydrogenated fatty acids, but unfortunately these conditions favor the above-mentioned side reactions. The efficiency of the reaction is measured in conjunction with the determination of the iodine number. The balancing of the saturated and isomeric, straight chain fatty acids to provide the desired maximum proportion of end product is expressed by a high angle of inclination of the dilatation temperature curve.

It is known that selectivity is largely influenced by the ratio between hydrogen which is chemisorbed on the surface of the catalyst and the chemisorbed polyene. For this reason, specific reaction conditions are chosen to keep the ($C_{H2}/C_{oil}$) ratio as low as possible. Elevated reaction temperatures, rather than low temperatures and moderate pressures, as applied and, above all, it is necessary that too great mixing intensity of the reaction components be avoided, thereby effecting a relative decrease of ($C_{H2}/C_{oil}$) due to increased resistance of the material in transition.

However, this common conventional practice has the disadvantage of long reaction times, and this renders continuous operation of selective hydrogenations uneconomical, especially where a great decrease in iodine number is needed, such as the difference of 70 to 90 iodine units in the case of selective hydrogenation of fish oil. For example, a known method and apparatus for continuous hydrogenation involves the foaming of a heterogeneous liquid phase and circulating this liquid phase in a circuit in a special mixing chamber which freely communicates with the gas space. This known apparatus provides good selectivity and does not considerably exceed the mixing intensity provided by a conventional agitator, so that the above-mentioned decrease in iodine number can be obtained only at uneconomical circulation rate under the required operating condition.

Further, it is difficult to provide a controlled dosage of hydrogen because it is necessary that hydrogen be freely admitted to all sides of the liquid phase. Other conventional processes and apparatus require more intensive mixing of the reactants and rely upon atomization of the heterogeneous liquid phase by nozzles in a hydrogen atmosphere or on the turbulent mixing of hydrogen and the liquid phase in centrifugal pumps, but these methods and apparatus have not gained practical acceptance because of inadequate and insufficient selectivity.

SUMMARY OF THE INVENTION

The apparatus of the invention comprises means for generating great shear forces of short duration on the reaction mixture to eliminate the material resistance in the transition between phases in each stage and during circulation, and also means for supplying the reaction mixture with predetermined amounts of hydrogen, means for controlling the velocity of circulation, means for controlling the temperature of each stage under separate and independent adjustment, and pressure means for controlling the total pressure of the hydrogen gas cushion over the liquid phase so that the reaction pressure and the total throughput are positively controlled.

According to another aspect of the invention, the apparatus used for the novel continuous and selective catalytic partial hydrogenation of organic compounds comprises a multiple stage reaction equipment, preferably a loop reactor, each of the stages including a reaction chamber through which flows the material to be treated in transverse direction, a circulation conduit for each of the reaction stages, a suction nozzle provided in the reaction stages and connected to the inlet end of the circulation conduit, a suction chamber accommodating the suction nozzle, and a conduit opening into the suction chamber to supply predetermined amounts of hydrogen under a predetermined pressure. The lower and central portions of each reaction chamber may be subdivided by means of partitions which are provided with flow passages, and the suction chamber of each may be arranged in the area of the central division.

A conduit for the supply of fresh hydrogen opens into the space above the partitions in the area of the suction chamber, and this supply conduit is equipped with a volumeter and a control valve.

The apparatus of the present invention permits many and various advantageous applications in the field of organic chemistry to obtain predetermined partial hydrogenations at selected bonds. The continuous partial hydrogenation of olefinic double bonds is explained below as one example. The advance achieved can be shown particularly by means of the hydrogenation of double bonds in polyunsaturated fatty acid derivatives, in this case, predetermined products which meet the requirements of basic fats for the production of margarine.

In practice, a loop-type cascade reactor is operated for the partial hydrogenation in such manner that fats are obtained which, due to their physical and chemical properties and due to their dilatation temperature curve having a high angle of inclination, can be used as high quality basic fats for margarine. Furthermore, the production outputs are great and are economical, and there is a saturation of double bonds, as can be inferred from reductions in iodine numbers by more than 70 units.

BRIEF DESCRIPTION OF THE DRAWINGS

In FIG. 1, there is shown the preferred apparatus for the continuous and selective partial hydrogenation of liquid organic compounds which are pumped into a 4-stage loop-type reactor via a raw material line with catalyst through line 16 for transverse movement under a hydrogen blanket in reaction chambers 12a, 12b, 12c and 12d corresponding to each of the 4 stages. The liquid organic compound and catalyst mixture enter chamber 12a for a first stage of hydrogenation treatment.

Figure 1:
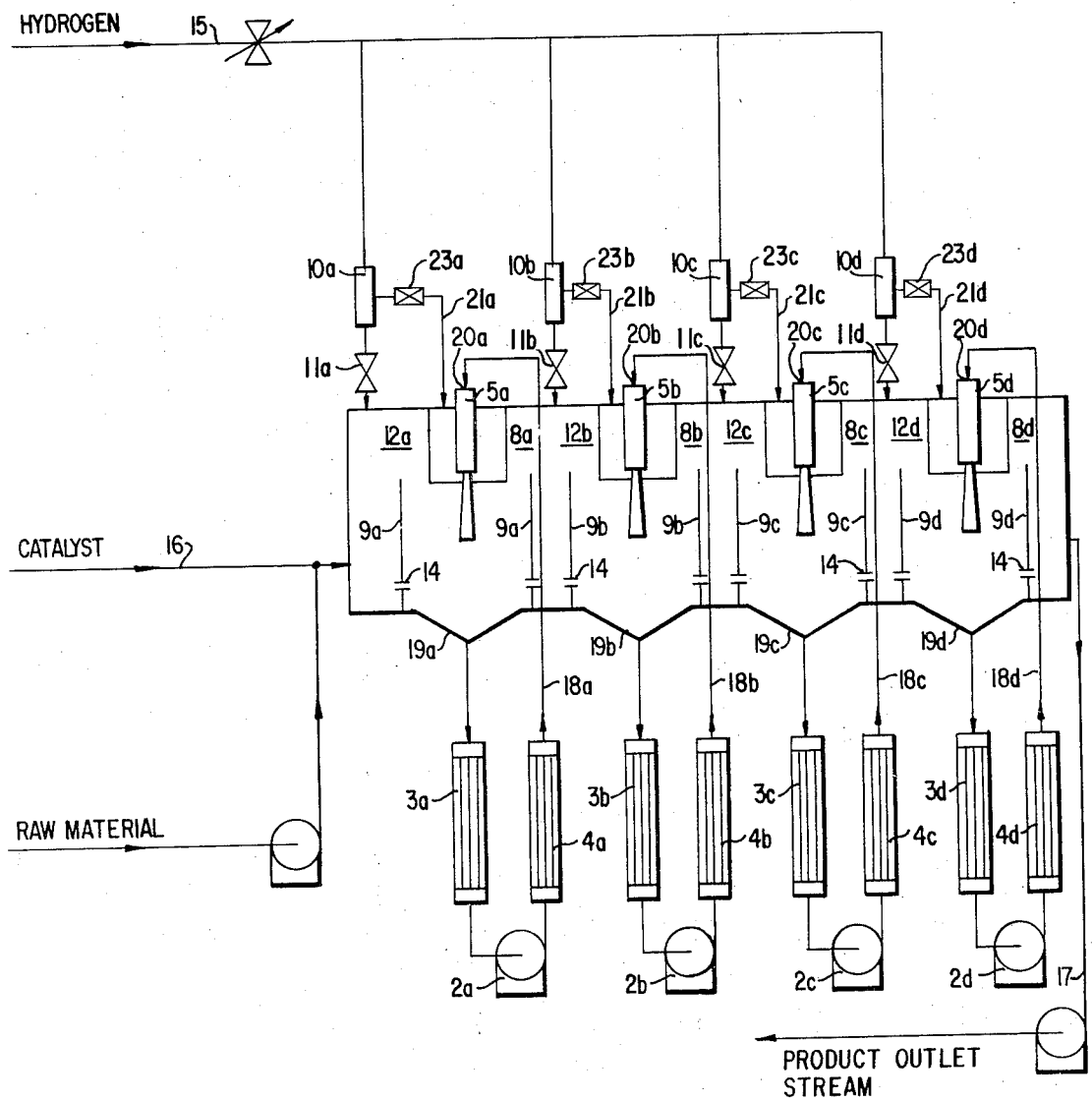
FIG. 1 is a schematic showing of apparatus which is in the form of a loop-type reactor having four stages.

The operation will now be described in terms of the first stage in chamber 12a.

A pair of vertical partitions 9a within reaction chamber 12a define the space in the chamber below the suction nozzle 5a in which very intense shear forces are effected as a result of the forced movement of the liquid feed and catalyst mixture through the suction nozzle 5a by means of circulating pump 2a which forces the liquid mixture through mouth 20a into the suction nozzle 5a. This forced circulation of the liquid mixture through the suction nozzle 5a creates very great shear forces of short duration within the space between the pair of partitions 9a, and the iodine number to drop very rapidly, indicating high efficiency of partial hydrogenation.

Openings 14 in the partitions provide communication between the individual stages. Forced circulation by pumps 2a, 2b, 2c and 2d creates a liquid flow from left to right in the successive stages in reaction chambers 12a, 12b, 12c and 12d through partitions 14. The line 18 delivers heated liquid mixture from pump 2a and heater 4a to the mouth 20a of the suction nozzle 5 while the return line taking the liquid from the conical bottom of the chamber at 19a cools the liquid going to the pump 2a through the cooler 3a. As explained above line 21a delivers an independent hydrogen supply taken from the hydrogen which is taken from the common feed line 15 and is controlled through valve 23c into the top of the enclosure (suction chamber) about suction nozzle 5a. The independent hydrogen supply is drawn by the nozzle 5a between the partitions 9a in the area of the reaction chamber immediately below 5a, as shown in FIG. 1.

Similarly, in each reaction chamber 12b, 12c and 12d, the forced circulation by pump 2b, 2c and 2d, respectively, provides a flow of liquid to which a heating effect through heaters 4b, 4c and 4d (useful for starting operations and weak exothermic reaction) and a cooling effect through cooler 3b, 3c and 3d on the upstream side and on the downstream side can be made.

A blanket of hydrogen 8a, 8b, and 8d in each stage overlies the liquid phase in each of the chambers 12a, 12b, 12c and 12d, and this blanket 8a, 8b, 8c, and 8d in each stage is fed from hydrogen conduit 15, and provides a gas-tight hydrogen cushion to which hydrogen is fed in controlled amounts from the separate feed-off lines 11a, 11b, 11c and 11d. This gas cushion surrounds the housing about the suction nozzle 5a, 5b, 5c and 5d in each stage.

By metering the hydrogen from line 15 through volumeter 10a, 10b, 10c and 10d, and valves 23a, 23b, 23c, and 23d, it is possible to admit predetermined amounts of hydrogen from each stage of the reaction under a predetermined pressure.

The hydrogen gas cushion which is present in conventional hydrogenation apparatus is not controlled independently and separately in each stage in respect to hydrogen pressure and volume as is done in the present invention, and this independent control in the apparatus of the present invention is of important advantage.

The use of the suction nozzle results in an extraordinary increase in the rate of reaction based upon the independent fed hydrogen sucked in by the suction nozzle, and generation of great shear forces in the suction nozzle is adapted to largely eliminate the material transition resistances. The favorable effects of high shear forces are due to the very short effective time. These shear forces are applied to the reaction liquid in each reaction loop, again in each circulation. In addition, in each of the individual reaction loops, controlled amounts of hydrogen are separately added at the suction nozzle location, the addition being controlled independently of the liquid circulation. It is the hydrogen control valve 23a, 23b, 23c, and 12d each of which is separately adjusted to provide an independent flow of hydrogen through 21a, 21b, 21c, and 21d respectively into suction chambers which surround each of the suction nozzles 5a, 5b, 5c, and 5d.

EXAMPLE

A de-acidified and pre-bleached fish oil having an initial iodine value of 147 was passed through a 4-stage cascade loop-type reactor at a throughput rate of 100 liters per hour and with a circulation ratio of $m=80$, $m$ being the ratio between the circulated amount per hour and the throughput per hour. The reaction temperature of each of the loops was in the range between 160 and 190° C. so that each reaction step had substantially the same conversion. This operation resulted in a high efficiency of the catalyst. The following Table gives the indices of the product obtained.

TABLE

| | Fish oil | |
| --- | --- | --- |
| | Non-hydrogenated | Hydrogenated |
| Iodine number (input) | 147 | 147 |
| Iodine number (output) | | 77 |
| Acid number | 0.4 | 0.4 |
| "Slip" melting point (° C.) | | 31.3 |
| Clear melting point (° C.) | | 35.3 |
| Solidification point (° C.) | 24.9 | 26.0 |
| Dilatation at— | | |
| 10° C | | 1037 |
| 20° C | | 690 |
| 25° C | | 507 |
| 30° C | | 270 |
| 35° C | | 59 |
| 40° C | | 15 |
| Trans-isomeric fatty acids | 7 | 45 |

When using conventional mixing chambers in such loop-type reactors, the reactor efficiency obtained with the above-described apparatus of the present invention could be approached only when using circulation ratios of $m=400$ and doubled operating pressures. However, circulation ratios of $m=400$ cannot be applied economically with large equipment handling some 100 tons per day.

Figure 2:
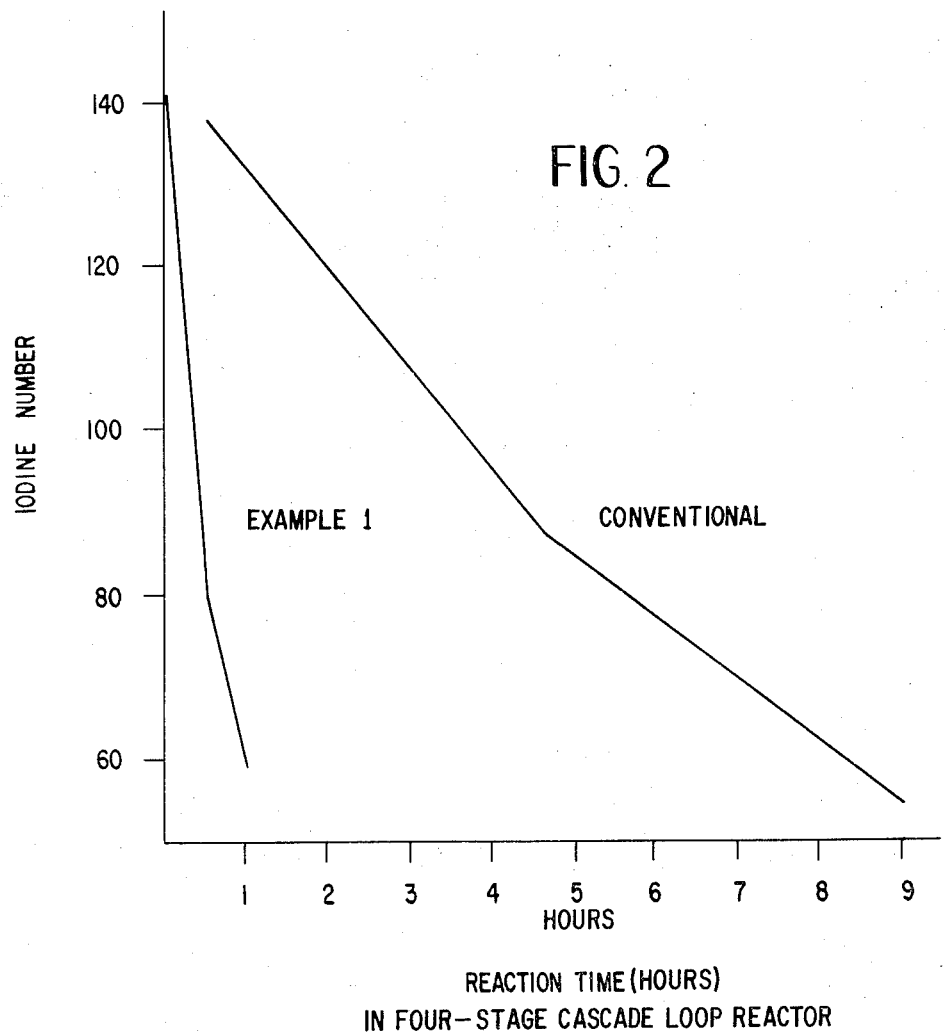
FIG. 2 is a graph comparing the preferred example herein and the conventional reaction in relation to the drop in iodine number (Y axis) and the reaction time in hours (X axis).

In addition, continuous circulation in the reactor loops effects more advantageous mixing. The high intensity of the injector can be inferred from FIG. 2 which shows that, for a hydrogenation of fish oil with an initial iodine number of 147 and a final iodine number of 77, reaction time of generally one tenth of the comparative value can be achieved with a total reduction of 70 iodine units under the same reaction conditions.

Continuous operation of the cascade comprising four reactor loops was assured if the pressure on the upstream side of the injectors was maintained at 2.5 atmospheres (35.56 p.s.i.) with respect to the pressure of the gas cushion of hydrogen, with a suction pressure of about 0.8 atmospheres (11.4 p.s.i.) simultaneously. The circulation ratios $m$ for the complete cascade were adjusted to more than 70, preferably 100, and the reaction temperatures were kept between 160 and 190° C. Commercial nickel catalysts in a range of concentration of 0.04 to 1% nickel related to the reaction liquid were used.

The following advantages were achieved with the apparatus of the present invention and the above-described process.

The relative small volume of liquid results in an advantage similar to that obtained from continuously-arranged stirred vessels which provide homogeneity of concentration and temperature, but this advantage is further enhanced by the relatively narrow dwell spectrum of the tubular reactor. The circulation ratio $m$ of the reaction chambers can be technically realized in a wide range, so that the reactor can be readily and optimally adapted to many other chemical reactions in addition to the hydrogenation of oils and fats. Further advantages are the effective discharge of even large amounts of heat, the freely selectable profile of temperature along the direction of flow, and the extensive elimination of material transition resistances in the case of heterogeneous reactions by special mixing nozzles.

The selectivity and the degree of hydrogenation may be easily and reliably adjusted in accordance with the requirements for the unsaturated compounds being treated. Reproducible constant physical-chemical characteristics of the finished products are achieved.

Moreover, the hydrogen gas forming the gas cushion may also include a gas or vapor of the type that will take part in a secondary reaction, in which case one may feed the fresh hydrogen directly to the chambers 12a, 12b, 12c and 12d.

The present embodiment is illustrative and not restrictive and the invention may be embodied in other forms without departing from the spirit thereof and the scope of the following claim.

What is claimed is:

1. A process for the continuous and selective catalytic partial hydrogenation of unsaturated fats and oils which are in the liquid state comprising:

mixing unsaturated liquid fat or oil with from 0.04 percent up to about 1 percent of a heterogeneous nickel hydrogenation catalyst;

introducing the mixture of unsaturated liquid fat or oil and catalyst into the inlet of a multiple-stage reactor having a plurality of closed loops constituting the separate stages thereof;

introducing hydrogen under pressure control means into each of the stages of said reactor to subject said liquid mixture of unsaturated fat or oil and catalyst to a hydrogen blanket over the liquid phase of a predetermined hydrogen pressure;

successively circulating said mixture of fat or oil and catalyst under an additional fresh and independent hydrogen supply under pressure through a suction nozzle in each stage and into each of said plurality of stages in said reactor, said additional fresh and independent hydrogen supply being introduced at the top of the reactor in each stage into a suction chamber surrounding the suction portion of the suction nozzle to be sucked thereby with liquid through said nozzle into the chamber below the nozzle and thus providing the reaction mixture with predetermined amounts of hydrogen in each stage from the fresh hydrogen supply under pressure;

adjusting the velocity of circulation and the temperature of each stage separately while maintaining the total pressure of the hydrogen gas cushion in each stage of the reactor to thereby control the total throughput;

each of said stages providing a short dwell time under mixed circulation; and generating great shear forces of short duration in the dwell stages of the liquid reaction mixture supply by passing the liquid mixture through a suction nozzle in the presence of the independent hydrogen supply under a predetermined pressure in each stage, which eliminates the completely saturated by-product formation which would normally occur in each stage.

References Cited

UNITED STATES PATENTS

| | | | |
|---|---|---|---|
| 1,271,575 | 7/1918 | Ittner | 260—409 |
| 3,089,755 | 5/1963 | Gfeller | 23—260 |

FOREIGN PATENTS 2,907  2/1965  Japan.

LEWIS GOTTS, Primary Examiner.

D. G. RIVERS, Assistant Examiner

U.S. Cl. X.R.

23—288 E